United States Patent
Sato

(10) Patent No.: US 10,126,996 B2
(45) Date of Patent: Nov. 13, 2018

(54) CONTROL APPARATUS, MANAGEMENT SYSTEM, CONTROL METHOD, AND STORAGE MEDIUM

(71) Applicant: CANON KABUSHIKI KAISHA, Tokyo (JP)

(72) Inventor: Junji Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 15/356,408

(22) Filed: Nov. 18, 2016

(65) Prior Publication Data

US 2017/0153858 A1 Jun. 1, 2017

(30) Foreign Application Priority Data

Nov. 28, 2015 (JP) .................. 2015-232526

(51) Int. Cl.
*G06F 3/12* (2006.01)
*H04N 1/00* (2006.01)
*G06K 15/00* (2006.01)

(52) U.S. Cl.
CPC ....... *G06F 3/1273* (2013.01); *H04N 1/00827* (2013.01)

(58) Field of Classification Search
None
See application file for complete search history.

(56) References Cited

U.S. PATENT DOCUMENTS

| 2012/0092724 A1* | 4/2012 | Pettis | B33Y 50/00 358/1.15 |
|---|---|---|---|
| 2012/0105903 A1* | 5/2012 | Pettis | G06F 3/12 358/1.14 |
| 2013/0329258 A1* | 12/2013 | Pettis | F16M 13/022 358/1.15 |
| 2016/0129636 A1* | 5/2016 | Cudak | G05B 15/02 700/97 |
| 2017/0072639 A1* | 3/2017 | Levine | B29C 67/0088 |

FOREIGN PATENT DOCUMENTS

JP 2011-008398 A 1/2011

* cited by examiner

*Primary Examiner* — Dov Popovici
(74) *Attorney, Agent, or Firm* — Canon U.S.A. Inc., IP Division

(57) ABSTRACT

A control apparatus is configured to execute a job for producing a three-dimensional object. The control apparatus acquires a captured image of the object that is produced according to an execution of the job by the control apparatus, which is recorded by an imaging device. The control apparatus outputs the acquired captured image, attribute information indicating an attribute of the job, and data included in the job and indicating a target to be produced, from the control apparatus outward as history information of the job.

21 Claims, 16 Drawing Sheets

FIG.4A

| ATTRIBUTE INFORMATION | JOB HISTORY NO. | 0001 |
|---|---|---|
| | TIME WHEN JOB IS STARTED | 2015/6/22 16:04 |
| | USER WHO EXECUTES JOB | User001 |
| | NAME OF JOB | PROTOTYPE.STL |
| | NAME OF PRINTER | Printer1 |
| | LOCATION WHERE PRINTER IS SET UP | HEADQUARTER BUILDING |
| | MATERIAL | ABS-RED |

FIG.4B

| CONTENT INFORMATION | JOB HISTORY NO. | 0001 |
|---|---|---|
| | NAME OF CONTENT | PROTOTYPE.STL |
| | CONTROL COMMAND | (G-CODE FILE) |
| | PREVIEW IMAGE | (PREVIEW IMAGE FILE) |
| |    NUMBER | 0001 |

FIG.4C

| CAPTURED IMAGE | JOB HISTORY NO. | 0001 |
|---|---|---|
| | MOVING IMAGE | (MOVING IMAGE FILE) |
| |    NUMBER | 0001 |
| |    TIME WHEN IMAGING IS STARTED | 2015/6/22 16:04 |
| |    TIME WHEN IMAGING IS ENDED | 2015/6/22 16:34 |
| | PICTURE | (PICTURE FILE) |
| |    NUMBER | 0001 |
| |    TIME WHEN IMAGE IS CAPTURED | 2015/6/22 16:14 |
| | PICTURE | (PICTURE FILE) |
| |    NUMBER | 0002 |
| |    TIME WHEN IMAGE IS CAPTURED | 2015/6/22 16:24 |
| | . . . | . . . |

FIG.4D

| ATTRIBUTE INFORMATION | JOB HISTORY NO. | 0001 |
|---|---|---|
| | TIME WHEN JOB IS ENDED | 2015/6/22 18:52 |
| | RESULT OF EXECUTION OF JOB | SUCCESS |
| | USER WHO ACQUIRES PRODUCTION PRODUCT | User001 |
| | TIME WHEN PRODUCTION PRODUCT IS ACQUIRED | 2015/6/22 19:47 |

FIG.6

AGENT SETTINGS

CONTENT DATA TO RECORD
- ☑ 3D MODEL DATA
- ☑ PREVIEW IMAGE
- ☑ USE CAMERA  [NETWORK CAMERA 1 ▼]
  - ☑ PICTURE OF COMPLETED PRODUCT
  - ☑ PICTURE OF PRODUCTION PROCESS
    - TIME INTERVAL AT WHICH IMAGE IS CAPTURED: [20] MINUTES
  - ☐ MOVIE OF PRODUCTION PROCESS
  - ☐ PICTURE WHEN COMPLETED PRODUCT IS REMOVED

— 601

SETTING OF TRANSMISSION OF JOB HISTORY
- ● TRANSMIT JOB HISTORY IN PARALLEL WITH PRODUCTION
- ○ START PRODUCTION AFTER TRANSMITTING JOB HISTORY IN ADVANCE
- ○ TRANSMIT JOB HISTORY ACCORDING TO SCHEDULE
  - ○ TRANSMIT JOB HISTORY EVERY [10] MINUTES
  - ○ TRANSMIT JOB HISTORY AT [18] : [00]

— 602

[ OK ]  [ CANCEL ]

FIG.8A

| JOB HISTORY ID | TIME WHEN JOB IS STARTED | USER WHO EXECUTES JOB | NAME OF JOB | NAME OF PRINTER | ... |
|---|---|---|---|---|---|
| 00000001 | 2015/6/22 16:04 | User001 | PROTOTYPE.STL | Printer1 | ... |
| 00000002 | 2015/6/23 19:02 | User003 | PART1.STL | Printer2 | ... |
| 00000003 | 2015/6/24 9:45 | User005 | PROTOTYPE.STL | Printer1 | ... |
| ... | ... | ... | ... | ... | ... |

FIG.8B

| JOB HISTORY ID | DATA ID |
|---|---|
| 00000001 | XX00000001 |
| 00000001 | XX00000002 |
| 00000001 | XX00000003 |
| ... | ... |
| 00000002 | XX00000006 |
| 00000002 | XX00000007 |
| ... | ... |

FIG.8C

| DATA ID | DATA TYPE | TIME WHEN IMAGE IS CAPTURED | DATA |
|---|---|---|---|
| XX00000001 | 3D MODEL DATA | NULL | ... |
| XX00000002 | PREVIEW IMAGE | NULL | ... |
| XX00000003 | CAPTURED IMAGE (PICTURE) OF PRODUCTION PROCESS | 2015/6/22 16:24 | ... |
| ... | ... | ... | ... |

FIG.13A

| | | |
|---|---|---|
| ATTRIBUTE INFORMATION | JOB HISTORY NO. | 0001 |
| | TIME WHEN JOB IS STARTED | 2015/6/22 16:04 |
| | USER WHO EXECUTES JOB | User001 |
| | NAME OF 3D MODEL DATA | PROTOTYPE.STL |
| | MATERIAL | ABS-RED |

FIG.13B

| | | | |
|---|---|---|---|
| CONTENT INFORMATION | JOB HISTORY NO. | | 0001 |
| | NAME OF 3D MODEL DATA | | PROTOTYPE.STL |
| | 3D MODEL DATA | | . . . |
| | PREVIEW IMAGE | | . . . |
| | | NUMBER | 0001 |

CONTROL APPARATUS, MANAGEMENT SYSTEM, CONTROL METHOD, AND STORAGE MEDIUM

BACKGROUND OF THE INVENTION

Field of the Invention

The present disclosure relates to a control apparatus that manages history information of a job for producing a three-dimensional object, a management system, a control method, and a storage medium.

Description of the Related Art

In recent years, a three-dimensional (3D) printer has been rapidly becoming common. The 3D printer is a collective term referring to control apparatuses that produces a three-dimensional (3D) object. A technique regarding the 3D modeling is also called additive manufacturing. On the other hand, a two-dimensional (2D) printer refers to printing apparatuses that print a target in a planar manner on paper (a sheet) or the like.

Examples of a production method employable by the 3D printer include Fused Deposition Modeling (FDM), Stereo Lithography (STL), Selective Laser Sintering (SLS), an inkjet method, and the like. A consumable material made of a material according to these production methods is used in the production of the object.

The 3D printer has existed conventionally, but has been rarely distributed on the general market because a mainstream thereof has been large-scale machinery for business use and usage thereof has been highly professional, and further, a price thereof has been extremely expensive. However, the recent technical innovation has promoted a reduction in size of casing and improvement of operability of software, and has advanced development of affordable products usable even by general consumers. Further, the enterprise 3D printer for business use has also started to achieve the enhancement of the performance and the reduction in cost compared to the conventional one, so that many companies have introduced the 3D printer in a manufacturing process of a prototype and a part of a product in recent years.

In the field of the 2D printer, there is a job history audit system discussed in Japanese Patent Application Laid-Open No. 2011-008398, which integrally manages history information of a job, such as copying, facsimile (FAX) transmission and reception, and printing, executed by the 2D printer, with use of a data server. The history information of the job is, in particular, a user who executes the print job, a date and time when the print job is executed, the number of printed pages, image data processed as a print target by the printing apparatus according to the execution of the job, and the like. The history information of the job can be referred to by searching for such history information of the job accumulated in the data server.

For the 3D printer, it is also desired to attain a system in which history information of a job for the production of the three-dimensional object is accumulated and managed, in a similar manner to the 2D printer.

In addition to attribute information such as the user who executes the job and the date and time when the job is executed, the job history management system for the 3D printer should also handle unique information that is not handled by the 2D printer as the history information. Examples of the unique information include model data expressing the three-dimensional object, and data indicating a target to be produced such as a control command including a production setting included in the job for the production of the three-dimensional object. Further, a captured image during the production of the three-dimensional object should also be handled as the history information. Especially, handling the captured image recorded during the production as the history information facilitates identification of an event that has caused a failure that has occurred during the production, and further, ensures security.

Generally, the 3D printer takes several hours for the production, whereby a data size of the captured image recorded during the fabrication as described above may become large. For example, if, after completion of the production, the captured image in which this production process is entirely recorded is output to the data server that manages the history information of the job at once, it may take an extremely long time until completion of this output. If the 3D printer is powered off by the user for the purpose of, for example, post-processing of the 3D printer after the end of the production, the output of the history information cannot be completed, and, in the worst case, the above-described captured image may end up being unable to be accumulated in the job history management system as the history information.

SUMMARY OF THE INVENTION

The present disclosure is directed to a control apparatus capable of reducing time taken for modeling a three-dimensional object to output history information of a job for the production after the production is executed.

According to an aspect of the present disclosure, a control apparatus is configured to execute a job for producing a three-dimensional object. The control apparatus includes an acquisition unit configured to acquire a captured image of the object that is produced according to an execution of the job by the control apparatus, which is recorded by an imaging device, and an output unit configured to output the acquired captured image, attribute information indicating an attribute of the job, and data included in the job and indicating a target to be produced from the control apparatus outward as history information of the job. The output unit starts outputting the acquired captured image within a time period from a start to an end of production carried out by the execution of the job.

According to another aspect of the present disclosure, a control apparatus is configured to execute a job for producing a three-dimensional object. The control apparatus includes an acquisition unit configured to acquire a captured image of the object that is produced according to an execution of the job by the control apparatus, which is recorded by an imaging device, and an output unit configured to output the acquired captured image, attribute information indicating an attribute of the job, and data included in the job and indicating a target to be produced from the control apparatus outward as history information of the job. The history information output by the output unit is the captured image regarding a partial time during a time period from a start to an end of production carried out by the execution of the job.

Further features of the present invention will become apparent from the following description of exemplary embodiments with reference to the attached drawings.

BRIEF DESCRIPTION OF THE DRAWINGS

FIGS. 4A, 4B, 4C, and 4D each illustrate one example of a job history generated by a job history generation unit.

FIG. 6 illustrates one example of a user interface (UI) of a screen for setting an agent unit.

FIGS. 8A, 8B, and 8C each illustrate an example of a job history managed by a job history management unit 504.

FIGS. 13A and 13B illustrate one example of a job history generated by a job history generation unit.

DESCRIPTION OF THE EMBODIMENTS

In the following description, exemplary embodiments for embodying the present disclosure will be described with reference to the drawings.

Figure 1:
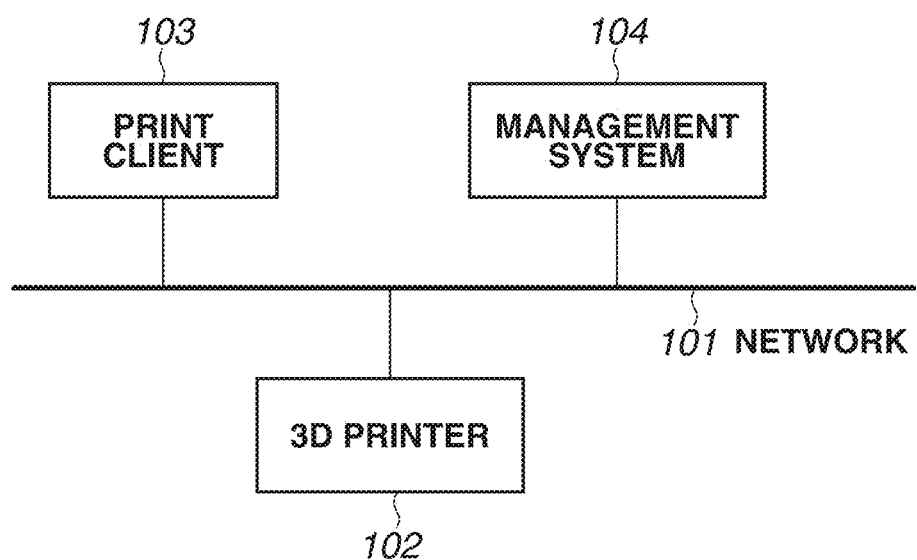
FIG. 1 illustrates an example of a configuration of a job history management system according to an exemplary embodiment.

In the following description, a first exemplary embodiment will be described. FIG. 1 illustrates an example of a configuration of a job history management system according to the exemplary embodiment.

A network 101 is a network such as an intranet or a local area network (LAN). A 3D printer 102 is one example of a control apparatus that fabricates a three-dimensional object, which is a sold object. A print client 103 is a client computer in which production control software is installed. Possible types of the print client 103 include a personal computer, a tablet computer, a smart-phone, and the like. A management system 104 is a management system including a data server that accumulates therein history information of a job executed by the 3D printer 102, and a management server that manages the history information accumulated in the data server.

The 3D printer 102, the print client 103, and the management system 104 can mutually transmit and receive information via the network 101. The network 101 may be a wireless network, such as a wireless LAN. Further, the network 101 may be a public network, such as the Internet, as long as the information can be transmitted and received via the network 101.

Figure 2:
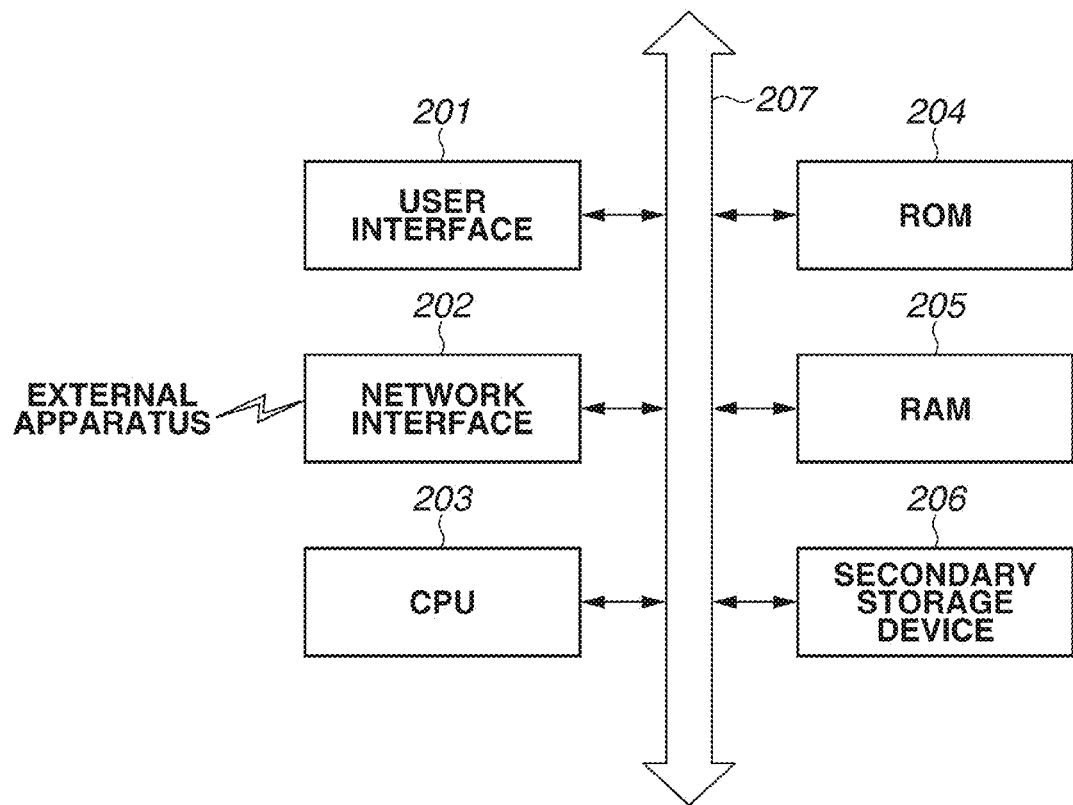
FIG. 2 illustrates an example of a module configuration of information processing functions.

FIG. 2 illustrates an example of a module configuration of information processing functions of each of the 3D printer 102, the print client 103, and the individual servers forming the management system 104.

A user interface 201 inputs and outputs information and a signal via a display, a keyboard, a mouse, a touch panel, a button, and/or the like. If the computer is unequipped with these hardware components, it is also possible to connect to and operate the computer from another computer with the aid of a remote desktop, a remote shell, or the like. A network interface 202 is connected to the network 101, such as the LAN, and communicates with another computer and a network apparatus. This module configuration may include an external memory interface (not illustrated) for using an external memory, such as a Universal Serial Bus (USB) memory. A central processing unit (CPU) 203 executes a program read in from a read only memory (ROM) 204, a random access memory (RAM) 205, a secondary storage device 206, or the like. An embedded program and data are recorded in the ROM 204. The RAM 205 is a temporary memory area. The secondary storage device 206 is a hard disk drive (HDD), a flash memory, or the like. Each of the above-described units 201 to 206 is connected to the other units via an internal bus 207.

Regarding the 3D printer 102, this module configuration further includes a hardware configuration (not illustrated) according to a production method. The hardware configuration according to the production method is, in particular, an engine unit of the 3D printer 102. The engine unit has, in addition to a CPU and a storage device such as a ROM and a RAM, hardware according to the production method that is controlled by this CPU. For example, in the case of Fused Deposition Modeling, this hardware is a print head (a head or an extruder), a motor that drives each of a stage and the print head in X, Y, and Z-axis directions, a heater that heats a nozzle of the print head, a fan for cooling, air supply, and air discharge, and the like. Examples of other production methods include STL, SLS, the inkjet method, and the like. Further, the 3D printer 102 includes a camera (which will be described below) that captures an object produced or being produced and how this production is carried out.

Figure 3:
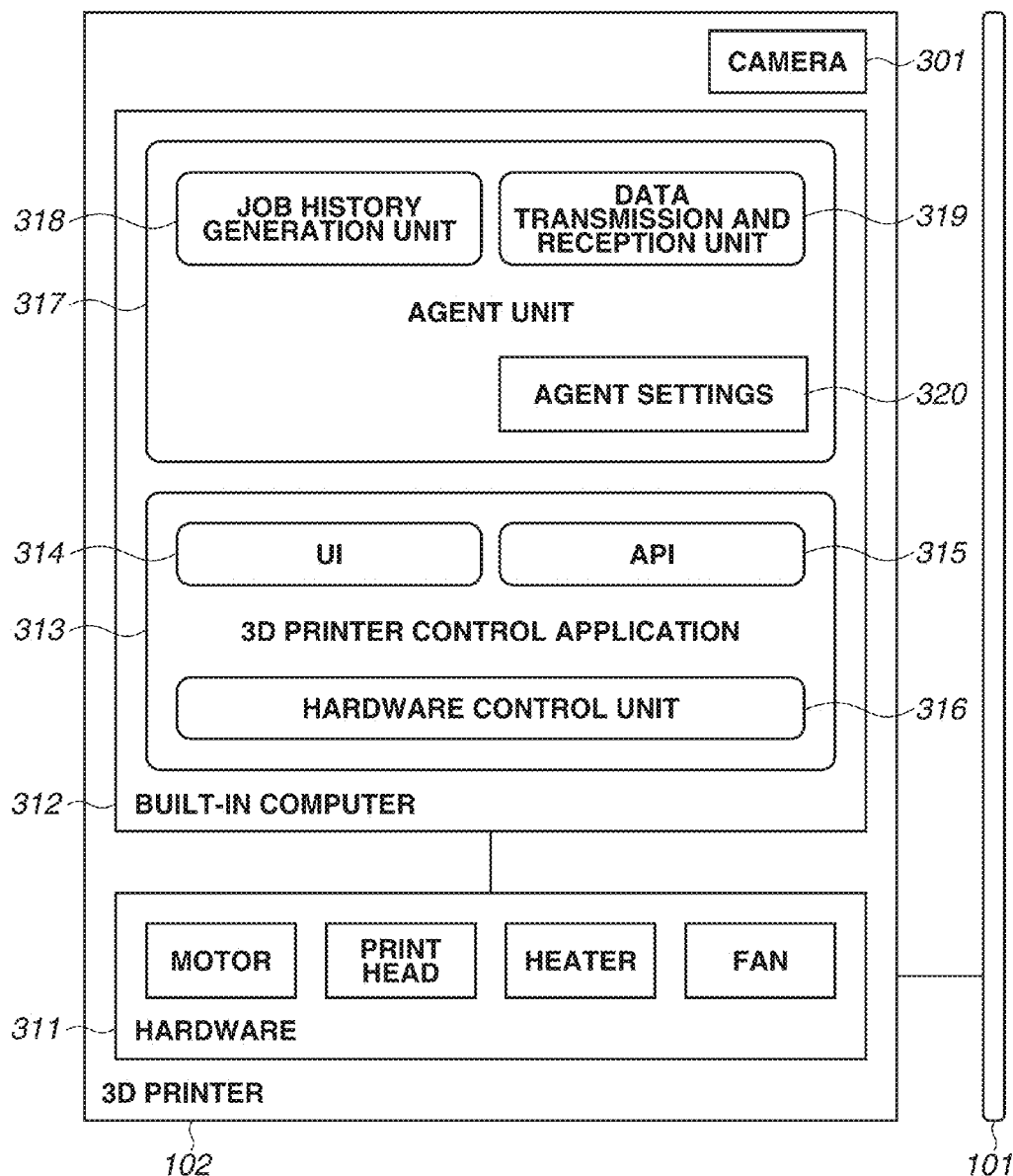
FIG. 3 illustrates one example of a software configuration and a hardware configuration of a three-dimensional (3D) printer.

FIG. 3 illustrates one example of a software configuration and a hardware configuration of the 3D printer 102.

A camera 301 images the object that is produced by the 3D printer 102 and how this production is carried out. The 3D printer 102 records image data of one or more still image(s) or a moving image in which the object is imaged within a time period from a start of the production to completion of the production, with use of this camera 301. The data recorded here is held in the secondary storage device 206 of the 3D printer 102 or a storage service in the network 101, which allows this data to be included in the history information of the job as necessary. The camera 301 may be a camera disposed outside the 3D printer 102 and configured to image the object that is produced by the 3D printer 102 and how the production is carried out.

Hardware 311 is the hardware unit according to the production method employed by the 3D printer 102. Hardware forming a 3D printer varies depending on the production method. For example, in the case of FDM, the hardware includes the print head, the motor that drives each of the stage and the print head in the X, Y, and Z-axis directions, the heater that heats the nozzle of the print head, the fan for cooling, and the like.

A built-in computer 312 is a computer built in the 3D printer 102. A built-in computer is dedicated to a necessary function, and is manufactured at low cost with an unnecessary function/performance/component omitted therefrom, compared to a general-purpose computer. The built-in computer 312 may be the general-purpose computer depending on a function and a performance required for the 3D printer 102.

A 3D printer control application 313 (hereinafter referred to as a control application 313) is an application executed on the built-in computer 312. The control application 313 includes a user interface (hereinafter referred to as a UI) 314, an application programming interface (API) 315, and a hardware control unit 316. Examples of the UI 314 include an inexpensive UI realized by a combination of a liquid crystal display (LCD) that displays only characters in several lines and hardware operation buttons, an LCD equipped with a touch panel, and the like. A user using the 3D printer 102 can instruct the 3D printer 102 to perform desired processing by confirming the state of the 3D printer 102 from a content displayed on the UI 314 and operating the UI 314. The API 315 accepts transmission and reception of a command and data from the external print client 103 and the agent unit 317. The hardware control unit 316 causes each of the units of the hardware 311 to operate, and, for example, outputs a production object and performs pre-processing and/or post-processing before and/or after the output, according to the command received via the UI 314 or the API 315 or a command issued by the control application 313 itself.

The agent unit 317 generates a job history and transmits the generated job history to the management system 104. The agent unit 317 can be realized as an application executed on the built-in computer 312. A job history generation unit 318 generates various kinds of information that form the job history based on the command and the data received by the API 315 or a data transmission and reception unit 319, or an execution status of the control application 313. Further, if the agent unit 317 can acquire the image data generated by imaging and recording the object that is produced by the camera 301, the captured image of the object can be included in the job history generated by the job history generation unit 318. The data transmission and reception unit 319 transmits the job history generated by the job history generation unit 318 to the management system 104 at a predetermined timing, and receives a setting of the agent unit 317 from the management system 104. Further, the data transmission and reception unit 319 also has a function of receiving a production request from the print client 103. Agent settings 320 are a setting file in which various kinds of settings for controlling the operation of the agent unit 317 are recorded.

The agent unit 317 may be constructed as an application module that operates on the 3D printer 102 separately from the built-in computer 312. Further, another possible configuration is to make an application corresponding to the agent unit 317 operate on the print client 103. In this case, this application would generate the job history based on the information regarding the job and the image data of the object produced or being produced that are acquired from the print client 103 itself, the 3D printer 102, and the like, and transmit the thus-generated job history to the management system 104. Similarly, it is also possible to make an application corresponding to the agent unit 317 operate on a not-illustrated print server. Alternatively, the function of the job history generation unit 318 of the agent unit 317 may be constructed by being divided across a plurality of information processing apparatuses. For example, the job history may be acquired in the following manner. An agent unit on the print client 103 generates a job history from 3D model data and a part of attribute information of the job, and an agent unit on the 3D printer 102 generates a job history including attribute information such as a job status and a date and time when the job is executed, and the image data. Then, these job histories are associated with each other based on the same job identification (ID) or the like, and stored in the management system 104.

FIGS. 4A, 4B, 4C and 4D each illustrate one example of the job history generated by the job history generation unit 318. The job history includes roughly classified three types of information, namely, the attribute information indicating various kinds of information associated with the execution of the job, data indicating a production target such as the 3D model data and a control command, and the image data captured by the camera 301.

FIG. 4A illustrates attribute information generated when the job is started. More specifically, this attribute information includes the date and time when the job is executed, the user who executes the job, a name of the 3D model data indicating a shape of the object specified as the production target in the job, and the like. If the job input from the print client 103 is executed, identification information indicating the print client 103 may be included as the attribute information. The start of the job in the present exemplary embodiment refers to a time when preparation for the production is started by the 3D printer 102. The preparation for the production is, in particular, an adjustment of a temperature of the head that extrudes a production material, and the like. Further, a start of the production refers to a time when the object actually starts to be produced while the production material is extruded from the head. Even both the time when the job is started and the time when the production is started may be included in the attribute information. Further, in a case where the preparation for the production is unnecessary, the time when the job is started is the same as the time when the production is started.

FIG. 4B illustrates content information regarding the object that is produced by the 3D printer 102. The content information includes the control command, a preview image, and the like. The control command is data included in the job for controlling the production by the 3D printer 102, which is transmitted when the production is requested from the print client 103 to the 3D printer 102. Examples of the control command include a G-code generated based on the 3D model data and a production setting, and the like. The management system 104 can identify, for example, the shape of the object that is the production target based on the control command. The preview image is an image virtually expressing a completion drawing of the production object to be produced based on the control command generated based on the 3D model data and the production setting. Then, not only the object corresponding to the 3D model data but also a support to be produced as necessary as a support during the production are included in the production object expressed by the control command and the preview image. In other words, information regarding the support included in the control command and the preview image is information such as presence or absence of the support, a structure of the support, and an amount of the production material required for the support.

Besides them, model data expressing, for example, the shape of the object that is the production target, and the like can also be included as the content information. Examples of a format of the model data include an STL format and the like.

FIG. 4C illustrates the captured image of the object that is produced by the 3D printer 102. The captured image is the image data including the one or more still image(s) in which the object during the production by the 3D printer 102, the completed object, and the like are imaged, or the moving image in which the production process is imaged. The captured image during the production is necessary as the history information of the job because this image may be able to serve as a hint for identifying an event that can be a cause affecting a final result of the three-dimensional object, such as an earthquake that has occurred during the production by the 3D printer 102. Further, the captured image during the production can also be usable to identify that, for example, the object produced or being produced has a double structure, and a confidential production object, a dangerous object, a component of them, or the like is produced therein. If, for example, the confidential object or the like is produced in the above-described support portion, the captured image can also serve as a hint for identifying that.

A time when the captured image is captured by the camera 301 is also included in the information about the captured image illustrated in FIG. 4C. The one or more still image(s) in which the production is recorded from the start to the end thereof may have a smaller data size of the captured image than the moving image in which the production is recorded from the start to the end thereof, as the captured image that the data transmission and reception unit 319 of the agent unit 317 transmits to the management system 104. Therefore, it is considered that a time required to output the data is reduced.

Both the 3D model data and the control command, or either one of them may be included in the job history generated by the job history generation unit 318. The management system 104 can acquire the information expressing the shape of the object by performing conversion processing on the control command included in the job history. In such a case, the print client 103 no longer has to transmit the 3D model data to the 3D printer 102 in addition to the control command included in the job for the production.

In this manner, there are various types of content information and captured images, but which type of content information and which type of captured image are stored in the management system 104 is determined according to a setting selected by the user. All of the types of content information and captured images may be stored in the management system 104, or only a part of the various types of content information and captured images may be stored in the management system 104 to reduce an occupied storage capacity in the management system 104.

FIG. 4D illustrates attribute information generated after the execution of the job is completed. More specifically, information determined after the execution of the job is completed, such as a result of the execution of the job, is included in this attribute information. In a case where the 3D printer 102 is such a 3D printer that user authentication is required for acquiring the production object, user information such as an ID of a user who acquires the production object, and information indicating a date and time when the production object is acquired are included in the attribute information generated after the execution of the job is completed.

Besides them, for example, a video image when the completed production object is removed from the 3D printer 102 may be included in the attribute information as the captured image. Managing the information when the production object is acquired after the end of the production in this manner facilitates identification of a job if the product of the three-dimensional object is removed by a third person, or if information is leaked due to this removal. Further, at the same time, managing this information leads to a deterrence to such a removal of the production object.

Each of the above-described attribute information, content information, and captured image illustrated in FIGS. 4A to 4D is generated at a different timing, whereby the data transmission and reception unit 319 transmits the job history to the management system 104 separately in a plurality of times, for the execution of one job. Therefore, in the examples illustrated in FIGS. 4A to 4D, the same job history number (No.) is included in each of the pieces of information. Due to this number, the management system 104 associates the job histories acquired from the plurality of times of transmission with one another and stores them as a single job history. The job history No. is information generated by the job history generation unit 318, and may be any number as long as this number is a unique number throughout the agent unit 317. Even when another agent unit transmits the job history to the management system 104 with use of the same job history No., the management system 104 can distinguish the job history for each agent unit. Alternatively, in FIGS. 4A to 4D, the uniqueness may be ensured by including a combination of other attribute values, such as the time when the job is executed and a name of the job, instead of the job history No. The content information and the captured image structured as illustrated in the drawings can also be further divided and transmitted to the management system 104 with use of the same job history No. In such a case, every time the job history generation unit 318 generates the job history including a part of the content information or the captured image during the production of the object, the data transmission and reception unit 319 can transmit this generated job history to the management system 104.

Figure 5:
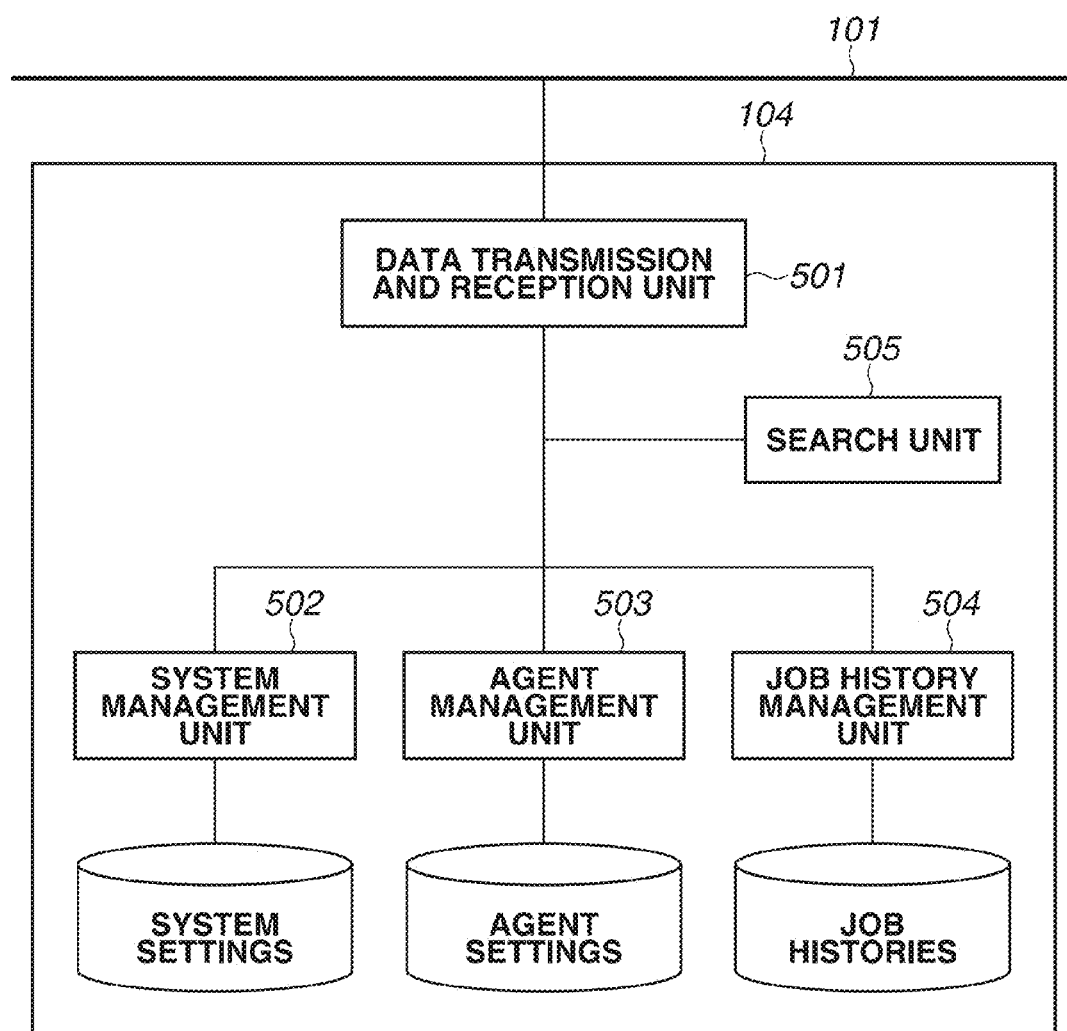
FIG. 5 illustrates one example of a software configuration of a management system.

FIG. 5 illustrates one example of a software configuration of the management system 104.

A data transmission and reception unit 501 receives the job history from the agent unit 317, and receives a search request from a web browser that operates on the print client 103 or the management system 104 to return a search result.

A system management unit 502 manages an operation status and settings of the job history management system. An agent management unit 503 manages an operation status and settings of each of agents in operation on the job history management system. A job history management unit 504 stores the job history received from each of the agents, and deletes the job history that is no longer necessary. A search unit 505 analyzes the search request received by the data transmission and reception unit 501, acquires the job history that meets a search condition via the job history management unit 504, and transmits the acquired job history to the web browser that is a transmission source of the search request via the data transmission and reception unit 501 as the search result.

FIG. 6 illustrates one example of a UI of a screen for setting the agent unit 317. The setting screen illustrated in FIG. 6 is displayed on the UI 201 of the 3D printer 102 where the agent unit 317 is in operation. A content set via the UI 201 is stored into the agent settings 320, and the management system 104 is also notified of this set content via the data transmission and reception unit 319 to allow the set content to be managed by the agent management unit 503. Further, a UI of a setting screen (FIG. 6) provided by the management system 104 may be displayed on the web browser of the print client 103. In this case, the set content is first managed by the agent management unit 503 of the management system 104, and is transmitted to the agent unit 317 of the 3D printer 102 to be stored into the agent settings 320 after that.

An area 601 is used to specify content data to be recorded by the job history generation unit 318. In the example illustrated in FIG. 6, the area 601 is configured to allow the user to select "3D MODEL DATA", "PREVIEW IMAGE", "PICTURE OF COMPLETED PRODUCT", "PICTURE OF PRODUCTION PROCESS", "MOVIE OF PRODUCTION PROCESS", AND "PICTURE WHEN COMPLETED PRODUCT IS REMOVED" as the content data. The content data selected here is generated by the job history generation unit 318 according to the execution of the job. The picture and the movie among the pieces of content data are permitted to be selected in the case where the 3D printer 102 includes the camera 301 and is capable of recording the captured image. Further, the picture and the movie are permitted to be selected in a case where an Internet Protocol (IP) address or the like of a network camera capable of imaging the object that is produced is registered with the management system 104 in advance, and the network camera is in a state that can be controlled from the management system 104.

In the example of the UI screen illustrated in FIG. 6, the picture of the production process is set so as to be taken at constant time intervals. However, the time interval for taking the picture of the production process does not necessarily have to be constant. For example, this time interval may be set in such a manner that the picture is taken at a relatively long time interval around after the start of the production and before the end of the production. Further, the moving image of the production process does not necessarily have to be a moving image in which the entire production process is imaged, and may be a moving image recorded by capturing the image a plurality of times during the time period from the start to the end of the production.

A target to which the above-described setting regarding the captured image during the production is applied may be the camera 301 or may be the job history generation unit 318. In the case where the setting is applied to the camera 301, the camera 301 records the captured image according to this setting. On the other hand, in the case where the setting is applied to the job history generation unit 318, the captured image as the history information is generated according to this setting based on the moving image from the start to the end of the production that is recorded by the camera 301. In either case, the captured image during the production is to be output as the history information in which the agent setting illustrated in FIG. 6 is reflected.

An area 602 is used to set the timing when the job history generated by the job history generation unit 318 is transmitted. If "TRANSMIT JOB HISTORY IN PARALLEL WITH PRODUCTION" is selected, the execution of the job is started after reception of the production request from the print client 103 and before completion of the transmission of the information that can be generated before the start of the job (more specifically, a part of the attribute information and the 3D model data) to the management system 104. Further, the content information and the captured image respectively generated and acquired additionally during the execution of the job are transmitted to the management system 104 every time this generation or acquisition happens. Normally, the production by the 3D printer 102 takes a longer time than a time taken to transmit the job history. Therefore, with respect to the attribute information and the content information generated by the time when the execution of the job is completed, the transmission thereof to the management system 104 is completed before the execution of the job is completed.

If "START PRODUCTION AFTER TRANSMITTING JOB HISTORY IN ADVANCE" is selected, the information that can be generated before the job is started is transmitted to the management system 104 after the production request is received from the print client 103, and then the execution of the job is started after this transmission is completed. The information generated before the job is started is, for example, a part of the attribute information and the 3D model data. This setting results in an increase in the time from the reception of the production request to the start of the job compared to when "TRANSMIT JOB HISTORY IN PARALLEL WITH PRODUCTION" is selected. However, this setting is different in terms of allowing the job history to be recorded even when the job is stopped due to, for example, a malfunction in the 3D printer 102 or cancel of the job by the user immediately after the job is started. In this case, the production also takes a longer time compared to the time taken to transmit the job history. Therefore, with respect to the attribute information and the content information generated by the time the execution of the job is completed, the transmission thereof to the management system 104 is also completed before the execution of the job is completed.

If "TRANSMIT JOB HISTORY ACCORDING TO SCHEDULE" is selected, the job history is stored into the secondary storage device 206 of the 3D printer 102, and, when the set transmission time has come, job histories stored at this point of time are collectively transmitted to the management system 104.

Figure 7:
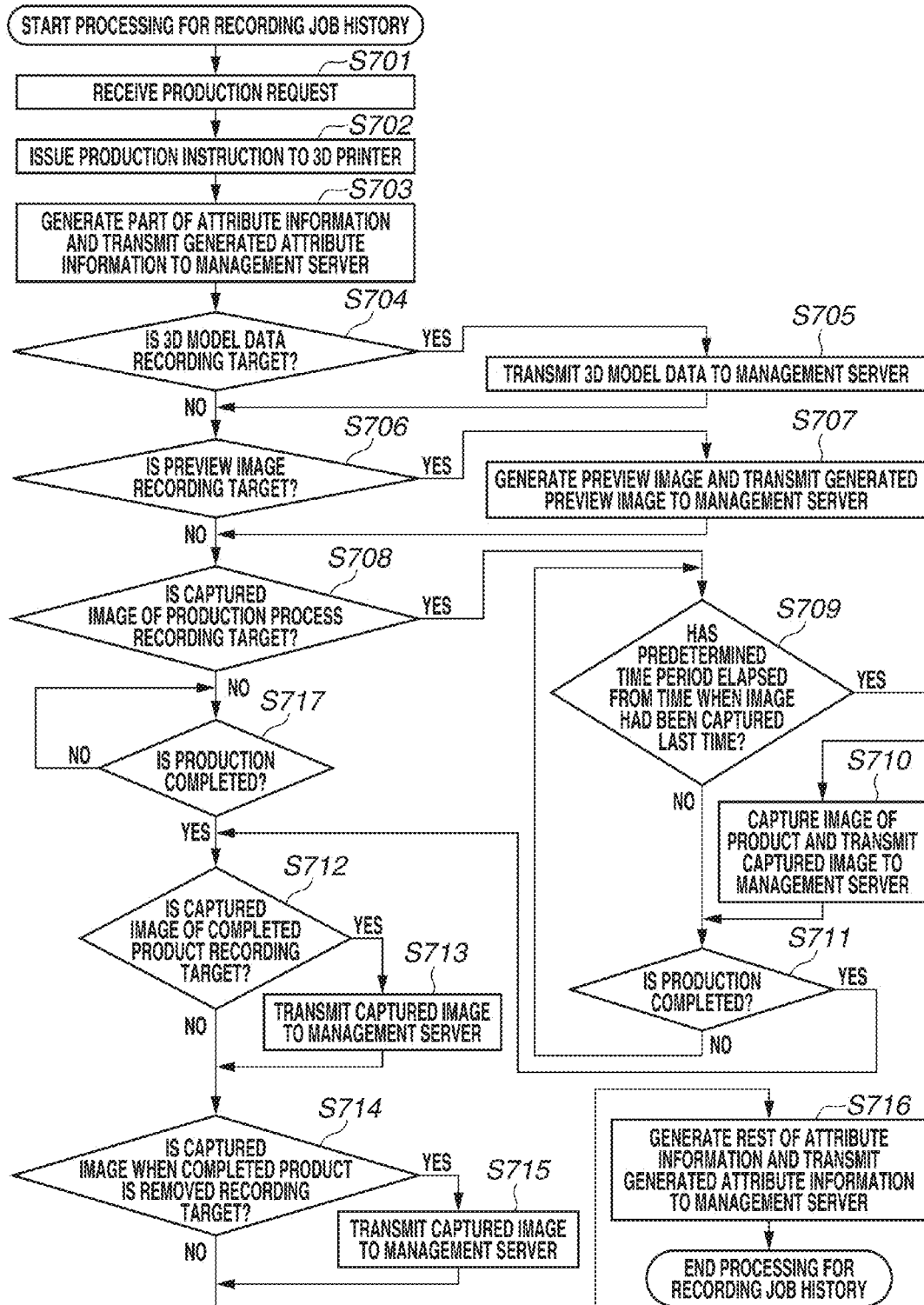
FIG. 7 is a flowchart illustrating an example of a flow of processing for recording the job history, which is performed by the agent unit.

FIG. 7 is a flowchart illustrating an example of a flow of processing for recording the job history, which is performed by the agent unit 317. This is an example when "TRANSMIT JOB HISTORY IN PARALLEL WITH PRODUCTION" is selected as the setting of the transmission of the job history indicated in the area 602. The processing illustrated in the flowchart of FIG. 7 is performed by the agent unit 317 of the 3D printer 102. In other words, the CPU 203 reads out the program recorded in the secondary storage device 206 and executes the read program, by which the processing illustrated in the flowchart of FIG. 7 is realized.

In step S701, the data transmission and reception unit 319 receives the production request from the print client 103. In step S702, the data transmission and reception unit 319 transmits the production request to the API 315 based on the production request received in step S701. In step S703, the job history generation unit 318 generates such attribute information as is illustrated in FIG. 4A from the production request received in step S701, and transmits the generated attribute information to the management system 104 via the data transmission and reception unit 319.

In step S704, the job history generation unit 318 confirms whether the 3D model data is set as a recording target by referring to the agent settings 320. If the 3D model data is set as the recording target (YES in step S704), the processing proceeds to step S705. If the 3D model data is not set as the recording target (NO in step S704), the processing proceeds to step S706. In step S705, the job history generation unit 318 extracts the 3D model data from the production request received in step S701, and transmits the extracted 3D model data to the management system 104 via the data transmission and reception unit 319.

In step S706, the job history generation unit 318 confirms whether the preview image is set as the recording target by referring to the agent settings 320. If the preview image is set as the recording target (YES in step S706), the processing proceeds to step S707. If the preview image is not set as the recording target (NO in step S706), the processing proceeds to step S708. In step S707, the job history generation unit 318 generates the preview image from the 3D model data included in the production request received in step S701, and transmits the generated preview image to the management system 104 via the data transmission and reception unit 319.

In step S708, the job history generation unit 318 confirms whether the captured image of the production process is set as the recording target by referring to the agent settings 320. If the captured image of the production process is set as the recording target (YES in step S708), the processing proceeds to step S709. If the captured image of the production process is not set as the recording target (NO in step S708), the processing proceeds to step S717.

In step S709, the job history generation unit 318 acquires the time interval for imaging the production process by referring to the agent settings 320, and determines whether the time period specified as the imaging time interval has elapsed from a time when the production process had been imaged last time. If the time period specified as the imaging time interval has elapsed from the time when the production process had been imaged last time (YES in step S709), the processing proceeds to step S710. If the time period specified as the imaging time interval has not elapsed from the time when the production process had been imaged last time (NO in step S709), the processing proceeds to step S711.

In step S710, the job history generation unit 318 identifies the camera 301 to be used by referring to the agent settings 320, instructs this camera 301 to capture the image, acquires the generated captured image from this camera 301, and transmits the acquired captured image to the management system 104 via the data transmission and reception unit 319. The data transmission and reception unit 319 starts transmitting the acquired captured image within the time period from the start to the end of the production, which speeds up the completion of the output of the captured image compared to outputting the captured image at once after the production. As a result, this method can reduce the time taken to output the history information of the job after the production.

In step S711, the job history generation unit 318 determines whether the production processing performed by the 3D printer 102 is completed. If the production is completed (YES in step S711), the processing proceeds to step S712. If the production is not completed (NO in step S711), the processing proceeds to step S709.

In step S717, the job history generation unit 318 determines whether the production processing performed by the 3D printer 102 is completed. If the production is completed (YES in step S717), the processing proceeds to step S712. If the production is not completed (NO in step S717), the processing stays in step S717.

In step S712, the job history generation unit 318 confirms whether the captured image of the completed product is set as the recording target by referring to the agent settings 320. If the captured image of the completed product is set as the recording target (YES in step S712), the processing proceeds to step S713. If the captured image of the completed product is not set as the recording target (NO in step S712), the processing proceeds to step S714. In step S713, the job history generation unit 318 identifies the camera 301 to be used by referring to the agent settings 320, instructs this camera 301 to capture the image, acquires the generated captured image from this camera 301, and transmits the acquired captured image to the management system 104 via the data transmission and reception unit 319.

In step S714, the job history generation unit 318 confirms whether the captured image when the completed product is removed is set as the recording target by referring to the agent settings 320. If the captured image when the completed product is removed is set as the recording target (YES in step S714), the processing proceeds to step S715. If the captured image when the completed product is removed is not set as the recording target (NO in step S714), the processing proceeds to step S716. In step S715, the job history generation unit 318 identifies the camera 301 to be used by referring to the agent settings 320, instructs this camera 301 to capture the image, acquires the generated captured image from this camera 301, and transmits the acquired captured image to the management system 104 via the data transmission and reception unit 319.

In step S716, the job history generation unit 318 generates such attribute information as is illustrated in FIG. 4D based on the result of the execution of the production by the 3D printer 102, and transmits the generated attribute information to the management system 104 via the data transmission and reception unit 319.

FIGS. 8A to 8C illustrate an example of the job history managed by the job history management unit 504.

FIG. 8A illustrates a table that holds the attribute information in the job history, and records therein the information received by the data transmission and reception unit 501 from the agent unit 317 in such formats as are illustrated in FIGS. 4A and 4D. A job history ID is an ID generated by the job history management unit 504 and is a unique value throughout the job history management system in the present exemplary embodiment, unlike the job history No. illustrated in FIGS. 4A to 4D.

FIG. 8B is a table for associating the attribute information included in the job history, and the content information and the captured image with each other. As illustrated in FIGS. 4B and 4C, a plurality of pieces of content information and a plurality of captured images may be generated with respect to one job, whereby a plurality of data IDs is also associated with the same job history ID in the example illustrated in FIG. 8B.

FIG. 8C illustrates a table that holds the data of the content information and the captured image in the job history. A data type is information for distinguishing, for example, the 3D model data, the preview image, and the picture of the completed product, which are such items as are selectable in the area 601. A time when the image is captured is a value recorded only when the data type is the captured image, such as "CAPTURED IMAGE OF PRODUCTION PROCESS".

Figure 9:
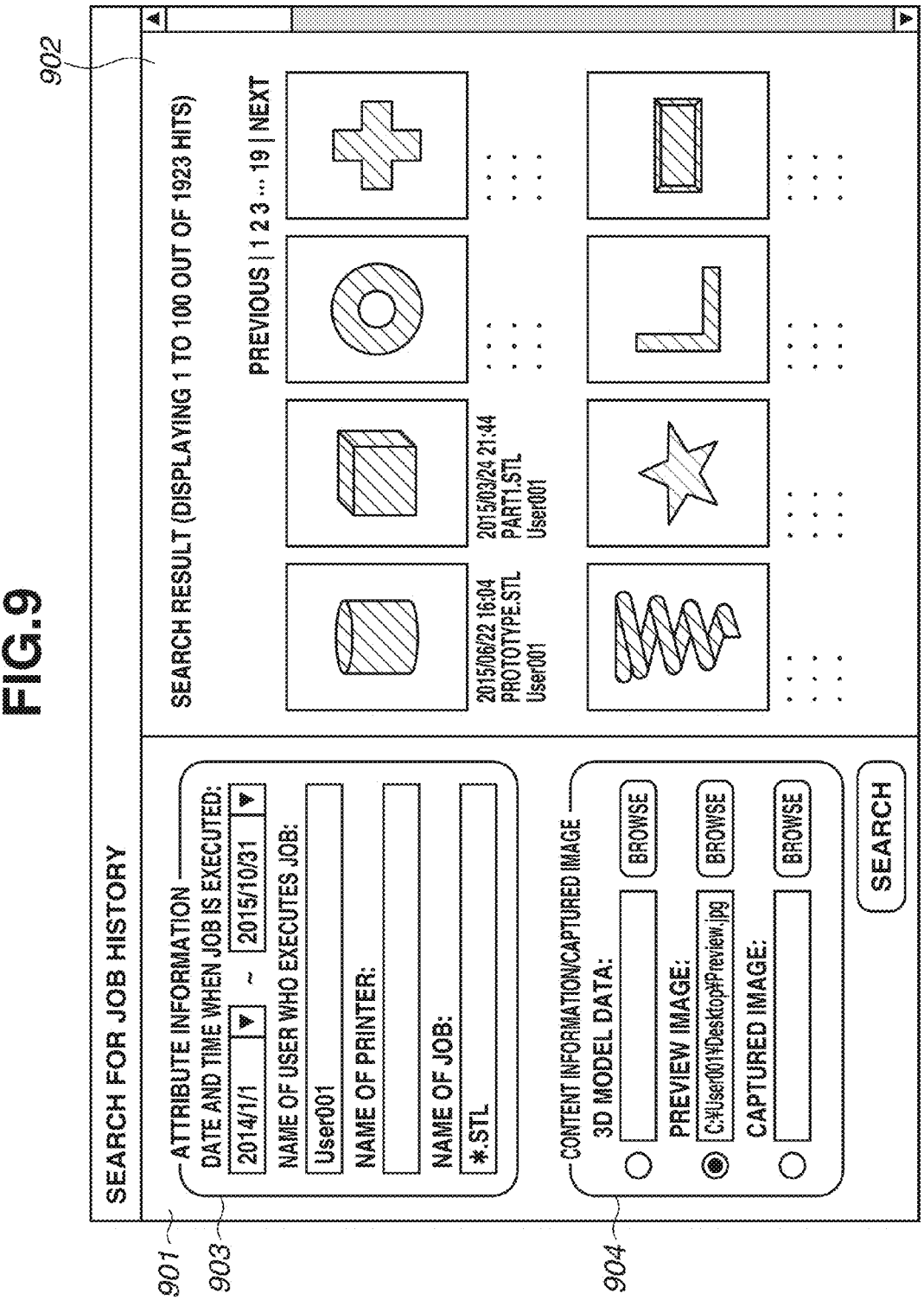
FIG. 9 illustrates one example of a UI of a screen for searching for the job history, which is provided by the management system.

FIG. 9 illustrates one example of a UI of a screen for searching for the job history, which is provided by the management system 104. The search screen illustrated in FIG. 9 is displayed on the UI 201 of the management system 104.

An area 901 is used to specify the condition for searching for the job history. An area 903 is used to specify a search condition regarding the attribute information. In the example illustrated in FIG. 9, the area 903 is configured to allow the user to specify the date and time when the job is executed, a name of the user who executes the job, a name of the printer which executes the job, and the name of the job as the attribute information. An area 904 is used to specify a search condition regarding the content information or the captured image. In the example illustrated in FIG. 9, the area 904 is configured to allow the user to specify any of the 3D model data, the preview image, and the captured image. The search based on the content data may be carried out with use of a comparison with specified binary data or a comparison using a hash value, or may be carried out with use of a known similar data search technique for comparing a feature of the 3D model data or the image. An area 902 is used to display the search result that meets the search condition specified in the area 901. In the example illustrated in FIG. 9, job histories meeting the search condition are displayed in a list together with thumbnails of the preview images. Clicking the thumbnail can cause a display of a detail of this job history on a display screen illustrated in FIG. 10.

Figure 10:
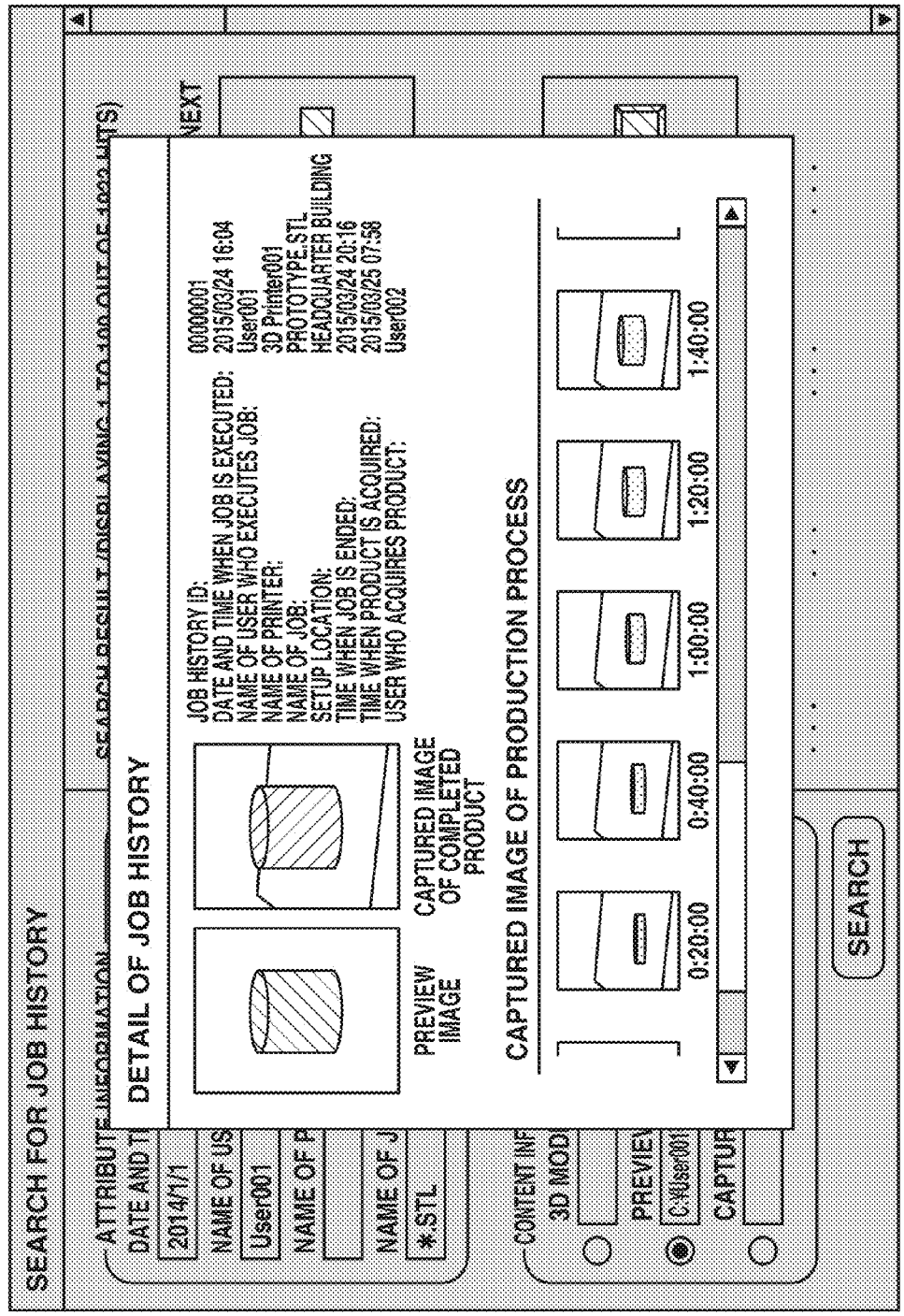
FIG. 10 illustrates one example of a UI of a screen where a detail of the job history is displayed.

FIG. 10 illustrates one example of a UI of a screen where the detail of the job history is displayed. The content information and the captured image, such as "PREVIEW IMAGE", "CAPTURED IMAGE OF COMPLETED PRODUCT", and "CAPTURED IMAGE OF PRODUCTION PROCESS", are displayed, in addition to such various kinds of attribute information as are not displayed in FIG. 9. In the example illustrated in FIG. 10, the individual images in "CAPTURED IMAGE OF PRODUCTION PROCESS" are displayed while being arranged in chronological order, but may be displayed like a movie by continuously playing back the images captured at the constant time intervals.

Figure 11:
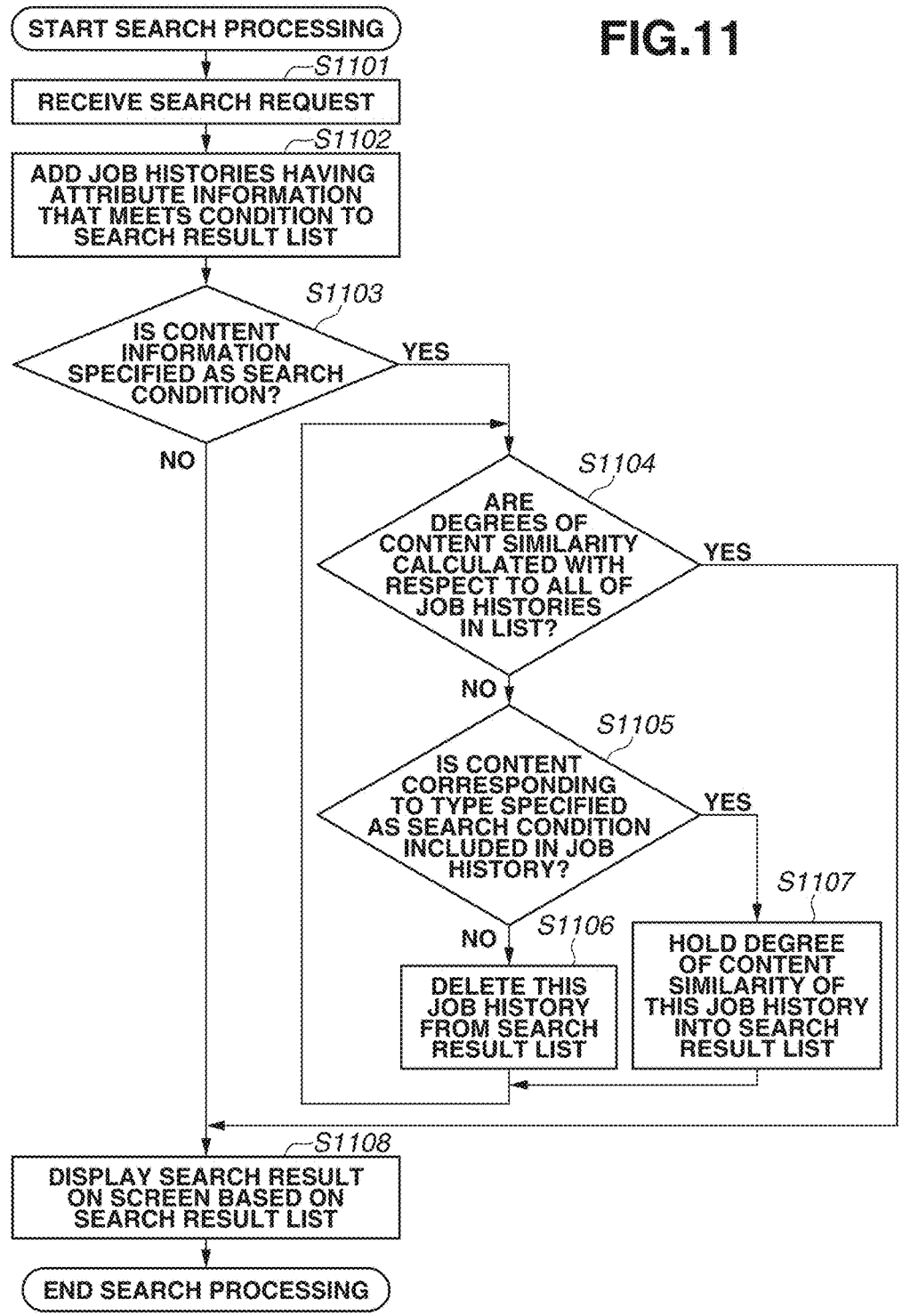
FIG. 11 is a flowchart illustrating an example of a flow of search processing performed by a search unit.

FIG. 11 is a flowchart illustrating an example of a flow of search processing performed by the search unit 505. The processing illustrated in the flowchart of FIG. 11 is performed by the search unit 505 of the management system 104. In other words, the CPU 203 reads out the program recorded in the secondary storage device 206 and executes the read program, by which the processing illustrated in the flowchart of FIG. 11 is realized.

In step S1101, the search unit 505 receives the search request transmitted from the print client 103 or the management system 104 via the data transmission and reception unit 501. In step S1102, the search unit 505 acquires the job histories that meet the search condition regarding the attribute information included in the search request received in step S1101 among the job histories managed by the job history management unit 504, and adds the acquired job histories to a search result list. Herein, the search result list may be temporarily stored in the RAM 205 of the management system 104, or may be stored in the secondary storage device 206 as a temporary file.

In step S1103, the search unit 505 determines whether the content information or the captured image is specified as the search condition in the search request received in step S1101. If the content information or the captured image is specified as the search condition (YES in step S1103), the processing proceeds to step S1104. If neither the content information nor the captured image is specified as the search condition (NO in step S1103), the processing proceeds to step S1108.

In step S1104, the search unit 505 determines whether processing for comparing the job history with the content information or the captured image specified as the search condition in the search request received in step S1101 is performed on each of the job histories included in the search result list generated in step S1102. If the execution of the comparison processing is completed with respect to all of the job histories in the search result list (YES in step S1104), the processing proceeds to step S1108. If the execution of the comparison processing is not completed (NO in step S1104), the processing proceeds to step S1105.

In step S1105, the search unit 505 determines whether same type of content information or captured image is included in the job history with respect to which the processing for comparing the job history with the content information or the captured image specified as the search condition in the search request received in step S1101 is not completed. If the same type of content information or captured image is included in the job history (YES in step S1105), the processing proceeds to step S1107. If the same type of content information or captured image is not included in the job history (NO in step S1105), the processing proceeds to step S1106.

In step S1106, the search unit 505 deletes this job history from the search result list. In other words, the job history that does not have the same type of content information or captured image as the search request is excluded from the search result. In step S1107, the search unit 505 calculates a degree of similarity with respect to the same type of data as the data specified in the search request among the pieces of content information or the captured images associated with this job history, and adds information indicating the degree of similarity to the search result list.

In step S1108, the search unit 505 displays the result on the search screen illustrated in FIG. 10 based on the search result list.

In the present exemplary embodiment, the output of the captured image recorded during the production is started within the time period from the start to the end of the production as the history information in the control apparatus that executes the job for producing the three-dimensional object. Further, a part of the captured image during the production is output to reduce the data size of the captured image. Outputting the history information of the job in this manner can reduce the time taken to output the history information of the job after the production by the 3D printer 102.

In the following description, a second exemplary embodiment will be described. The present exemplary embodiment will be described as an exemplary embodiment in a case where the 3D printer 102 is not connected to the network 101. More specifically, the print client 103 writes out the control command directed to the 3D printer 102 into a communicable external storage device, such as a USB memory. Then, at the same time as that, the print client 103 generates the job history and transmits the generated job history to the management system 104. According to the present exemplary embodiment, even in the case where the 3D printer 102 is not connected to the network 101, the job history can be recorded in the management system 104.

In the present exemplary embodiment, the configurations illustrated in FIGS. 1 to 3, 5, and 8 to 11 are similar to the configurations in the first exemplary embodiment, and similar features and components to the first exemplary embodiment will be identified by the same reference numerals and descriptions thereof will be omitted. In the following description, only differences from the first exemplary embodiment will be described.

Figure 12:
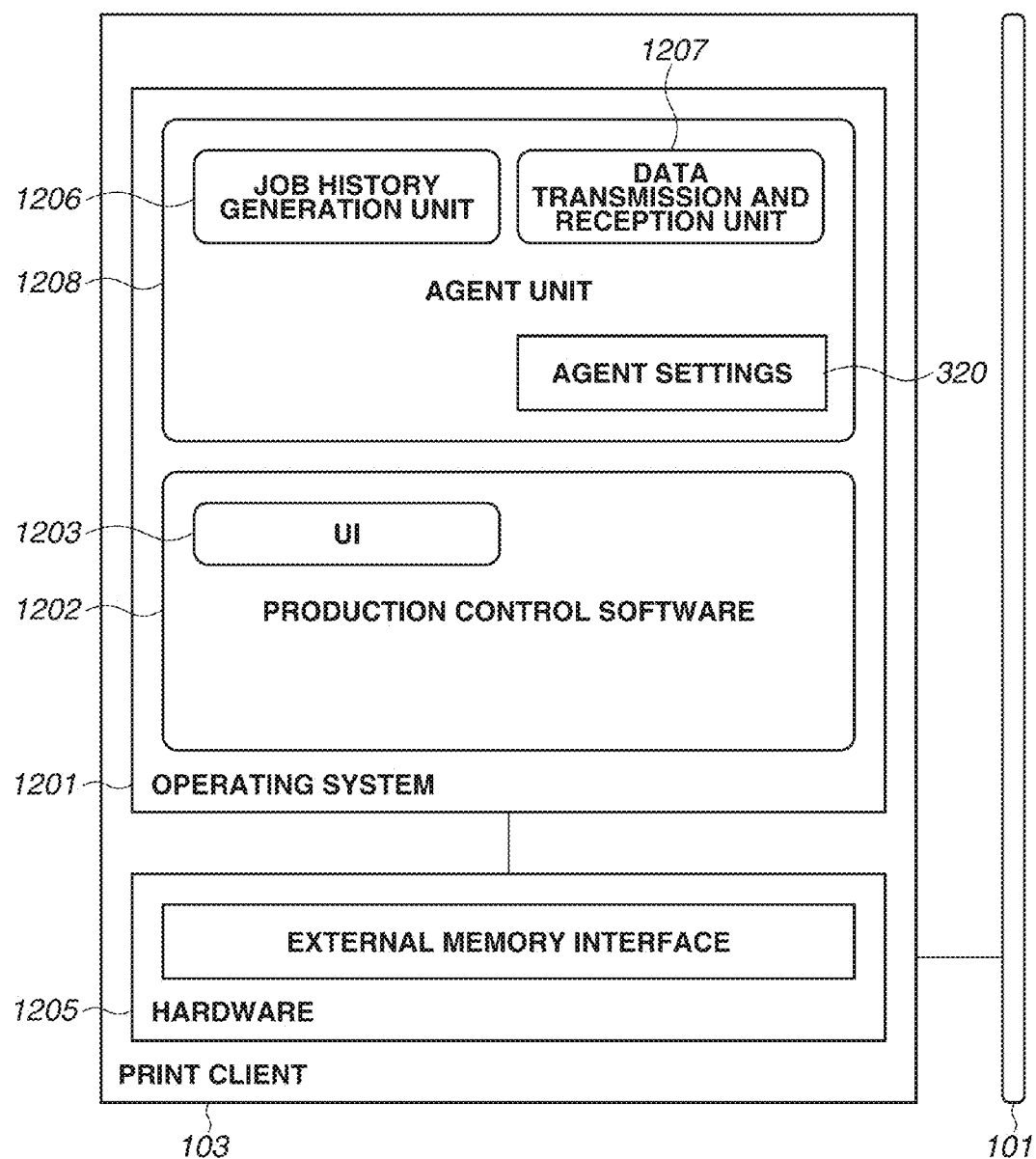
FIG. 12 illustrates one example of a software configuration and a part of a hardware configuration of a print client according to a second exemplary embodiment.

FIG. 12 illustrates one example of a software configuration and a part of a hardware configuration of the print client 103 according to the second exemplary embodiment.

An operating system 1201 is an operating system (OS) of the print client 103. Production control software 1202 is an application that operates on the operating system (hereinafter referred to as the OS) 1201. The production control software 1202 is an application for using the 3D printer 102, and includes a UI 1203. The UI 1203 provides a screen for selecting the 3D model data to be produced by the 3D printer 102 and configuring an output setting such as a filling rate and a filling pattern.

The production control software 1202 also has a function of generating the control command executable by the 3D printer 102 based on the 3D model data and the set content selected on the UI 1203. The generated control command is stored into the external memory, such as the USB memory, via the external memory interface. The stored control command can trigger the execution of the production by the user's inserting the external memory into the 3D printer 102 and causing the control command to be read in.

Hardware 1205 is a hardware unit of the print client 103. The print client 103 includes the interface for connecting the external memory, such as the USB memory. A job history generation unit 1206 generates a job history based on the 3D model data selected on the UI 1203 and the control command generated by the production control software 1202.

A data transmission and reception unit 1207 transmits the job history generated by the job history generation unit 1206 to the management system 104 at a predetermined timing, and receives a setting of an agent unit 1208 from the management system 104. The agent unit 1208 generates the job history, and transmits the generated job history to the management system 104.

FIGS. 13A and 13B each illustrate one example of the job history generated by the job history generation unit 1206. This job history is basically similar to those illustrated in FIGS. 4A, 4B, 4C and 4D, but a part of the information cannot be generated compared to FIGS. 4A, 4B, 4C and 4D since the agent unit 1208 does not operate on the 3D printer 102 but operates on the print client 103. More specifically, the information regarding the 3D printer 102, such as the name of the printer, among the pieces of attribute information illustrated in FIG. 4A, is missing. Further, the history information generated along with the production processing, such as the captured image illustrated in FIG. 4C, is missing. Further, the attribute information based on the result of the execution of the production, which is illustrated in FIG. 4D is also missing.

Figure 14:
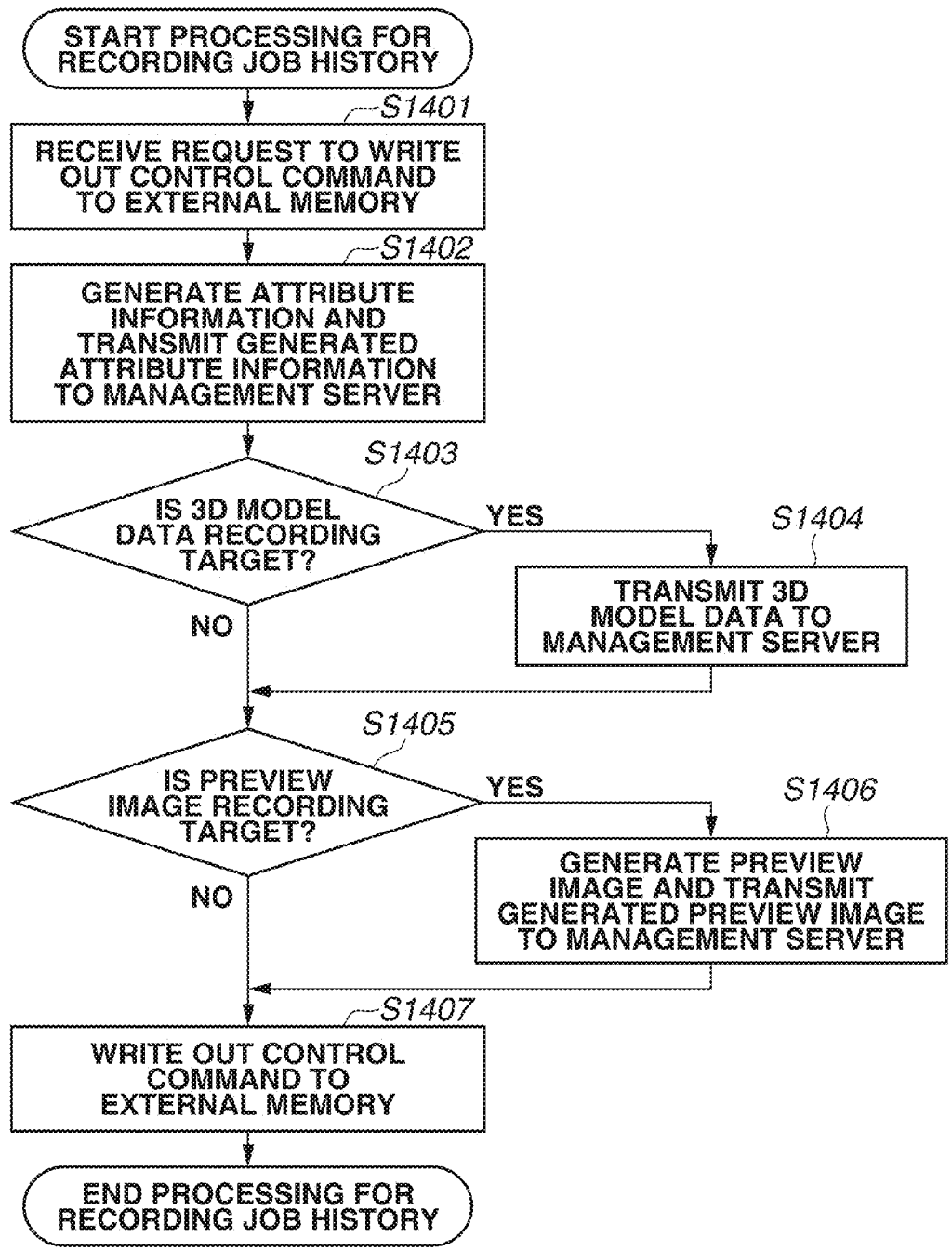
FIG. 14 is a flowchart illustrating an example of a flow of processing for recording the job history, which is performed by an agent unit.

FIG. 14 is a flowchart illustrating an example of a flow of processing for recording the job history. The processing illustrated in the flowchart of FIG. 14 is performed by the agent unit 1208 of the print client 103. In other words, the CPU 203 reads out the program recorded in the secondary storage device 206 and executes the read program, by which the processing illustrated in the flowchart of FIG. 14 is realized.

In step S1401, the data transmission and reception unit 1207 receives a request to write out the control command into the external memory from the production control software 1202.

In step S1402, the job history generation unit 1206 generates such attribute information as is illustrated in FIG. 13A from the request to write out the control command into the external memory that has been received in step S1401, and transmits the generated attribute information to the management system 104 via the data transmission and reception unit 1207. In step S1403, the job history generation unit 1206 confirms whether the 3D model data is set as the recording target by referring the agent settings 320. If the 3D model data is set as the recording target (YES in step S1403), the processing proceeds to step S1404. If the 3D model data is not set as the recording target (NO in step S1403), the processing proceeds to step S1405.

In step S1404, the job history generation unit 1206 extracts the 3D model data from the request to write out the control command into the external memory, which has been received in step S1401, and transmits the extracted 3D model data to the management system 104 via the data transmission and reception unit 1207.

In step S1405, the job history generation unit 1206 confirms whether the preview image is set as the recording target by referring to the agent settings 320. If the preview image is set as the recording target (YES in step S1405), the processing proceeds to step S1406. If the preview image is not set as the recording target (NO in step S1405), the processing proceeds to step S1407. In step S1406, the job history generation unit 1206 generates the preview image from the 3D model data included in the request to write out the control command into the external memory, which has been received in step S1401, and transmits the generated preview image to the management system 104 via the data transmission and reception unit 1207.

In step S1407, the agent unit 1208 writes out the control command generated by a slicer 1204 into the external memory via the operating system 1201.

In the present exemplary embodiment, the print client 103 generates the job history and transmits the generated job history to the management system 104 when writing out the control command directed to the 3D printer 102 into the external memory. Even in the case where the 3D printer 102 is not connected to the network 101, the job history can be recorded in the management system 104.

In the following description, a third exemplary embodiment will be described. The present exemplary embodiment will be described as an exemplary embodiment that stops the production being performed by the 3D printer 102 during the production if a predetermined condition is satisfied based on the history information output from the 3D printer 102. For example, in the present exemplary embodiment, the configurations illustrated in FIGS. 1 to 11 are similar to the configurations in the first exemplary embodiment, and similar features and components to the first exemplary embodiment will be identified by the same reference numerals and descriptions thereof will be omitted. In the following description, only differences from the first exemplary embodiment will be described.

Figure 15:
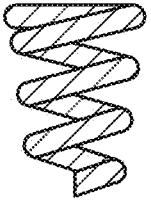
FIG. 15 illustrates one example of a UI of a screen for setting a condition for stopping production, which is provided by the management system.

FIG. 15 illustrates one example of a UI of a screen for setting the condition for stopping the production, which is provided by the management system 104. A production stop setting refers to a function of, if detecting a job meeting the condition, forcibly stopping the execution of this job. Examples of the object that can become a target of which production is to be stopped include a confidential object, a dangerous object such as a weapon, an object that might infringe a copyright, a component of them, and the like. The search screen illustrated in FIG. 15 is displayed on the UI 1201 of the management system 104, and a content set thereon is stored by the system management unit 502 into the secondary storage device 206 as a system setting. A plurality of conditions can be set as the production stop setting, and, in the example illustrated in FIG. 15, two conditions, No. 0001 and No. 0002 are set by way of example.

First, an example of a condition for stopping the production based on the attribute information of the job will be described. The name of the 3D model is set as a type and "CONFIDENTIAL" is set as a condition, respectively, in the condition No. 0001. In other words, the condition No. 0001 means that, upon detection of execution of a job including a character string "CONFIDENTIAL" in the name of the 3D model, a command to forcibly stop the job is transmitted to the 3D printer 102 that is executing this job.

Next, an example of a condition for stopping the production based on the data indicating the target of the production will be described. The 3D model data, and the 3D model data shaped like a screw are set as the type and the condition, respectively, in the condition No. 0002. In this case, the condition No. 0002 means that, upon detection of execution of a job handling the 3D model data identical or similar by a predetermined or higher degree of similarly to the 3D model data specified as the condition, this job is forcibly stopped. The data indicating the target of the production may be the control command for the production by the 3D printer 102 or the preview image.

The attribute information and the content information similar to such various kinds of search conditions as are presented in the area 901 illustrated in FIG. 9 can be set as the type illustrated in FIG. 15. Further, if the type is the attribute information, a character string can be set as the condition. If the type is the contend data, a similar data file to this type can be set as the condition. In the condition, a plurality of items may be combined with use of a logical operator, or a weight may be set to each condition and the production may be stopped only if a numerical value calculated according to the weight exceeds a threshold value. Further, the processing when the condition is satisfied may be other processing than the above-described stop of the production. For example, an administrator of the job history management system may be notified of the satisfaction with the condition with use of an electronic mail or the like, or the satisfaction with the condition may be recorded in the job history to allow whether the condition is satisfied to be set as the search condition on the search screen illustrated in FIG. 9.

Figure 16:
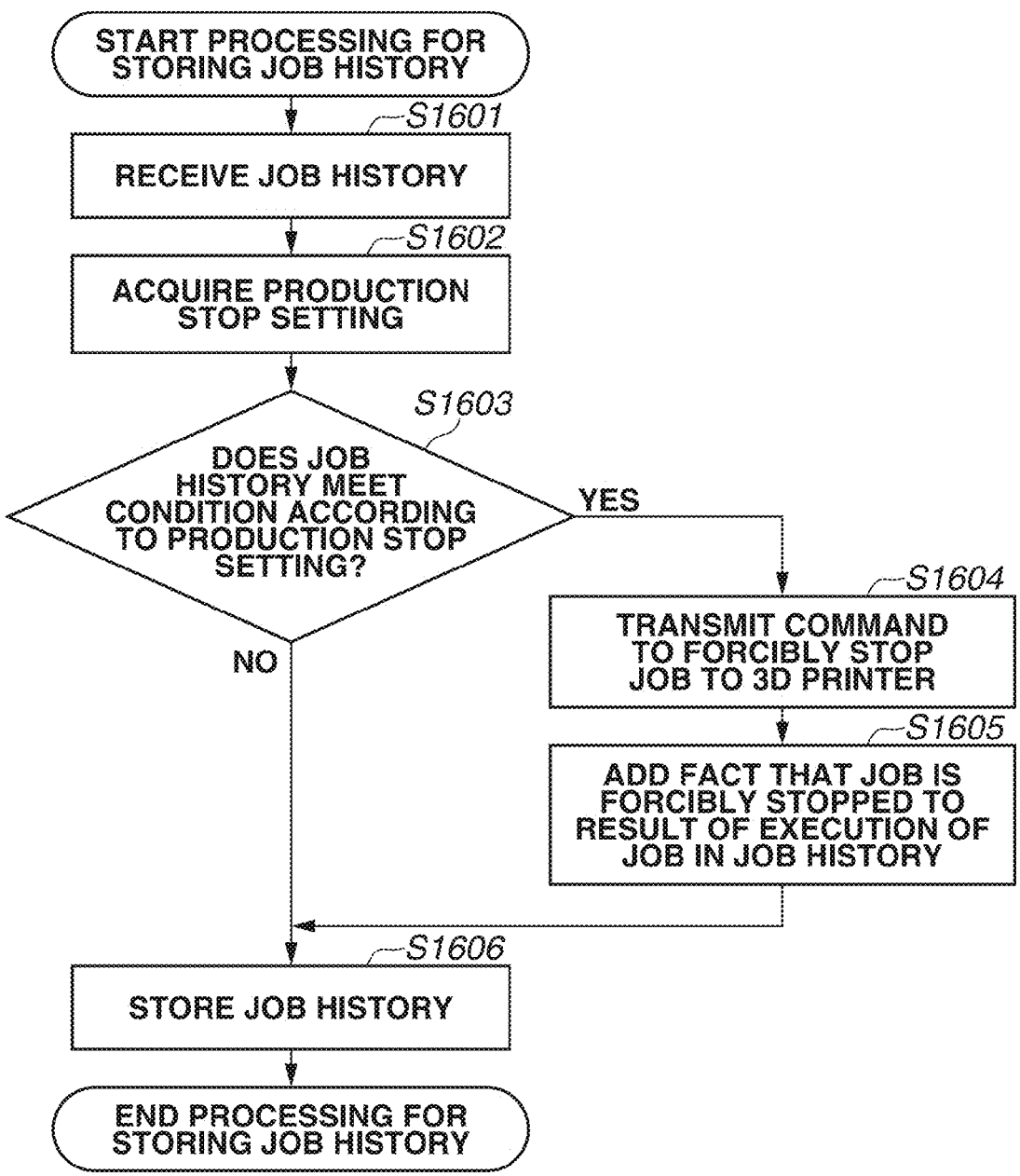
FIG. 16 is a flowchart illustrating an example of a flow of processing for storing the job history, which is performed by the management system.

FIG. 16 is a flowchart illustrating an example of a flow of processing for storing the job history, which is performed by the management system 104. The processing illustrated in the flowchart of FIG. 16 is performed by the job history management unit 504 of the management system 104. In other words, the CPU 203 reads out the program recorded in the secondary storage device 206 and executes the read program, by which the processing illustrated in the flowchart of FIG. 16 is realized.

In step S1601, the job history management unit 504 receives the job history transmitted from the agent unit 317 via the data transmission and reception unit 501.

In step S1602, the job history management unit 504 acquires the production stop setting included in the system settings via the system management unit 502.

In step S1603, the job history management unit 504 inquires of the search unit 505 about whether the job history received in step S1601 meets the condition according to the production stop setting acquired in step S1602. If the search unit 505 determines that this job history meets the condition according to the production stop setting (YES in step S1603), the processing proceeds to step S1604. If the search unit 505 determines that this job history does not meet the condition according to the production stop setting (NO in step S1603), the processing proceeds to step S1605.

In step S1604, the job history management unit 504 generates the command to forcibly stop the job that is directed to the 3D printer 102 via the agent management unit 503, and transmits the generated command to the 3D printer 102 via the data transmission and reception unit 501.

In step S1605, the job history management unit 504 adds the fact that the job is forcibly stopped to a value indicating the result of the execution of the job in the attribute information in the job history received in step S1601.

In step S1606, the job history management unit 504 stores the job history received in step S1601 into the secondary storage device 206.

In the present exemplary embodiment, the management system 104 determines whether the job history meets the predetermined condition and forcibly stops the execution of the job by the 3D printer 102 if the job history meets the condition, when storing the job history. This method may allow the production to be forcibly stopped when the predetermined condition is satisfied regarding the production by the 3D printer 102, during the production by the 3D printer 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232526, filed Nov. 28, 2015, which is hereby incorporated by reference herein in its entirety.

What is claimed is:

1. A control apparatus configured to execute a job for producing a three-dimensional object, the control apparatus comprising:
   a memory storing instructions; and
   a processor which is capable of executing the instructions causing the control apparatus to:
   receive a transmission setting of history information;
   acquire a captured image of an object of a production process that is produced according to an execution of the job by the control apparatus, the captured image being recorded by an imaging device;
   output the acquired captured image of the object of the production process, attribute information indicating an attribute of the job, and data included in the job and indicating a target to be produced as history information of the job, from the control apparatus outward to accumulate in a data server;

acquire a captured image of a completed object according to a completion of the job by the control apparatus, the captured image being recorded by the imaging device; and output the acquired captured image of the completed object as history information of the job, from the control apparatus outward to accumulate in the data server, wherein, according to the received transmission setting, outputting the acquired captured image of the object of the production process is started within a time period from a start to an end of a production carried out by the execution of the job.

2. The control apparatus according to claim 1, wherein the output captured image includes at least any of one or more still image(s) and a moving image.

3. The control apparatus according to claim 1, wherein the data included in the job and indicating the target to be produced is output within the time period from the start to the end of the production.

4. The control apparatus according to claim 1, wherein the data included in the job and indicating the target to be produced includes at least any of a control command for producing the object by the control apparatus, model data expressing a shape of the object, and a preview image of the object.

5. The control apparatus according to claim 4, wherein the control command and the preview image include information regarding a support to be produced as necessary as a support when the object is produced.

6. The control apparatus according to claim 1, wherein the attribute information including information indicating a date and time when the job is executed, identification information of the control apparatus where the job is executed, and identification information of a user who issues an instruction to execute the job is output as the history information of the job before the start of the production.

7. The control apparatus according to claim 1, wherein the attribute information including at least any of the captured image when the object produced by the execution of the job is removed from the control apparatus, and identification information of a user who removes the object produced by the execution of the job from the control apparatus is output as the history information of the job after the end of the production.

8. The control apparatus according to claim 1, wherein the control apparatus is connected to a management server for managing the history information of the job executed by the control apparatus via a network, the management server comprising a memory and a processor, wherein the attribute information including information indicating a date and time when the job is executed, identification information of the control apparatus where the job is executed, and identification information of a user who issues an instruction to execute the job is output to the management server as the history information of the job before the start of the production, wherein at least any of the data included in the job and indicating the target to be produced and the acquired captured image of the object of the production process is further output to the management server as the history information of the job within the time period from the start to the end of the production, and wherein, in a case where a content of the output history information meets a predetermined condition for stopping the production being performed by the control apparatus, the production is stopped when a command for stopping the production being performed by the control apparatus is received from the management server.

9. The control apparatus according to claim 1, wherein the history information of the job is output into a Universal Serial Bus (USB) memory connected to the control apparatus.

10. The control apparatus according to claim 1, wherein the control apparatus controls the production of the three-dimensional object by additive manufacturing.

11. A control apparatus configured to execute a job for producing a three-dimensional object, the control apparatus comprising:

a memory storing instructions; and a processor which is capable of executing the instructions causing the control apparatus to:

acquire a captured image of the object that is produced according to an execution of the job by the control apparatus, the captured image being recorded by an imaging device; and output the acquired captured image, attribute information indicating an attribute of the job, and data included in the job and indicating a target to be produced as history information of the job, from the control apparatus outward to accumulate in a data server, wherein the output captured image includes still images regarding plural timings during a time period from a start to an end of production carried out by the execution of the job.

12. The control apparatus according to claim 11, wherein the output captured image includes at least any of one or more still image(s) and a moving image.

13. A management server managing history information of a job executed by a control apparatus configured to execute the job for producing a three-dimensional object, the management server comprising:

a memory storing instructions; and a processor which is capable of executing the instructions causing the management server to:

manage a captured image of the object that is produced according to an execution of the job by the control apparatus, attribute information indicating an attribute of the job, and data included in the job and indicating a target to be produced, as the history information of the job, the captured image being recorded by an imaging device, wherein the managed history information is history information which has been outputted from the control apparatus to accumulate in a data server, and wherein the captured image included in the managed history information includes still images regarding plural timings during a time period from a start to an end of production carried out by the execution of the job.

14. The management server according to claim 13, wherein a command for stopping the production being performed by the control apparatus is transmitted, in a case where a content of the managed history information meets a predetermined condition for stopping the production being performed by the control apparatus.

15. The management server according to claim 13, wherein the instructions further cause the management server to:

search for the history information of the job from pieces of the managed history information based on a search condition including at least any specified item among the attribute information, the data indicating the target to be produced, and the captured image.

16. A control method for a control apparatus configured to execute a job for producing a three-dimensional object, the control method comprising:
receiving a transmission setting of history information;
acquiring a captured image of the object of a production process that is produced according to an execution of the job by the control apparatus, the captured image being recorded by an imaging device;
outputting the acquired captured image of the object of the production process, attribute information indicating an attribute of the job, and data included in the job and indicating a target to be produced as history information of the job, from the control apparatus outward to accumulate in a data server;
acquiring a captured image of a completed object according to a completion of the job by the control apparatus, the captured image being recorded by the imaging device; and
outputting the acquired captured image of the completed object as history information of the job, from the control apparatus outward to accumulate in the data server,
wherein, according to the received transmission setting, the output of the acquired captured image of the object of the production process is started within a time period from a start to an end of production carried out by the execution of the job.

17. A control method for a control apparatus configured to execute a job for producing a three-dimensional object, the control method comprising:
acquiring a captured image of the object that is produced according to an execution of the job by the control apparatus, which is recorded by an imaging device; and
outputting the acquired captured image, attribute information indicating an attribute of the job, and data included in the job and indicating a target to be produced as history information of the job, from the control apparatus outward to accumulate in a data server,
wherein the output captured image including still images regarding plural timings during a time period from a start to an end of production carried out by the execution of the job.

18. A control method for a management server managing history information of a job executed by a control apparatus configured to execute the job for producing a three-dimensional object, the control method comprising:
managing a captured image of the object that is produced according to an execution of the job by the control apparatus, attribute information indicating an attribute of the job, and data included in the job and indicating a target to be produced, as the history information of the job, the captured image being recorded by an imaging device,
wherein the managed history information is history information which has been outputted from the control apparatus to accumulate in a data server, and
wherein the captured image included in the managed history information is output to the management server by the control apparatus within a time period from a start to an end of production carried out by the execution of the job.

19. A control method for a management server managing history information of a job executed by a control apparatus configured to execute the job for producing a three-dimensional object, the control method comprising:
managing a captured image of the object that is produced according to an execution of the job by the control apparatus, attribute information indicating an attribute of the job, and data included in the job and indicating a target to be produced, as the history information of the job, the captured image being recorded by an imaging device,
wherein the managed history information is history information which has been outputted from the control apparatus to accumulate in a data server, and
wherein the captured image included in the managed history information includes still images regarding plural timings during a time period from a start to an end of production carried out by the execution of the job.

20. A non-transitory computer readable storage medium on which is stored a computer program for making a computer execute a control method for a control apparatus configured to control an execution of a job for producing a three-dimensional object, the control method comprising:
receiving a transmission setting of history information;
acquiring a captured image of the object of a production process that is produced according to the execution of the job by the control apparatus, the captured image being recorded by an imaging device;
outputting the acquired captured image of the object of the production process, attribute information indicating an attribute of the job, and data included in the job and indicating a target to be produced as history information of the job, from the control apparatus outward to accumulate in a dater server,
acquiring a captured image of a completed object according to a completion of the job by the control apparatus, the captured image being recorded by the imaging device; and
outputting the acquired captured image of the completed object as history information of the job, from the control apparatus outward to accumulate in the data server,
wherein, according to the received transmission setting, the output of the acquired captured image of the object of the production process is started within a time period from a start to an end of production carried out by the execution of the job.

21. A non-transitory computer readable storage medium on which is stored a computer program for making a computer execute a control method for a control apparatus configured to control an execution of a job for producing a three-dimensional object, the control method comprising:
acquiring a captured image of the object that is produced according to the execution of the job by the control apparatus, the captured image being recorded by an imaging device; and
outputting the acquired captured image, attribute information indicating an attribute of the job, and data included in the job and indicating a target to be produced as history information of the job, from the control apparatus outward to accumulate in a data server,
wherein the output captured image includes still images regarding plural timings during a time period from a start to an end of production carried out by the execution of the job.

* * * * *